United States Patent [19]

Faccia

[11] Patent Number: 5,553,937
[45] Date of Patent: Sep. 10, 1996

[54] TRUCK FOR SHREDDING AND MIXING PRODUCTS FOR ZOOTECHNICAL USE INCLUDING IMPROVED CUTTERS

[76] Inventor: Tiziano Faccia, Viale dell'Industria 3, 35023 Bagnoli Di Sopra, (Prov. of Padova), Italy

[21] Appl. No.: 530,850

[22] Filed: Sep. 20, 1995

[30] Foreign Application Priority Data

Sep. 28, 1994 [IT] Italy .................. PD940097 U

[51] Int. Cl.⁶ ...................... B01F 7/24; B01F 15/00
[52] U.S. Cl. ............. 366/302; 366/314; 366/603; 241/101.76; 241/101.761
[58] Field of Search .................. 366/302, 307, 366/314, 318, 319, 323, 603; 241/33, 37, 101.76, 101.761, 101.8, 186.4

[56] References Cited

U.S. PATENT DOCUMENTS

| | | | |
|---|---|---|---|
| 4,003,502 | 1/1977 | Barcell | 241/101.761 X |
| 5,020,918 | 6/1991 | Faccia | 366/603 X |
| 5,082,188 | 1/1992 | Urich | 241/101.761 X |
| 5,175,917 | 1/1993 | Faccia | 29/267 |
| 5,429,436 | 7/1995 | Stone | 366/314 X |
| 5,462,354 | 10/1995 | Neier | 366/314 |

FOREIGN PATENT DOCUMENTS

| | | |
|---|---|---|
| 0244977 | 11/1987 | European Pat. Off. . |
| 0404028 | 12/1990 | European Pat. Off. . |
| 0492395 | 7/1992 | European Pat. Off. . |

*Primary Examiner*—Charles E. Cooley
*Attorney, Agent, or Firm*—Guido Modiano; Albert Josif

[57] ABSTRACT

A truck for shredding and mixing products for zootechnical use, including: a self-propelled or towed wheeled chassis; a container supported on the chassis and substantially shaped like an inverted frustum, with an open top; a rotating scroll in the container that has a vertical axis and an external profile that lies on an ideal substantially conical surface; shredding cutters fitted at the profile of the scroll; and vertically arranged countercutters, shaped substantially like a circular sector, and having respective vertices pivoted to the wall of the container in substantially radial positions and extractably inserted through appropriate slots of the container. The countercutters are arranged so that the pivoted vertex of each one is in a substantially median region of the wall of the container and so that each countercutter extends downward from its pivoted vertex so as to effect the lower part of the wall of the container.

9 Claims, 3 Drawing Sheets

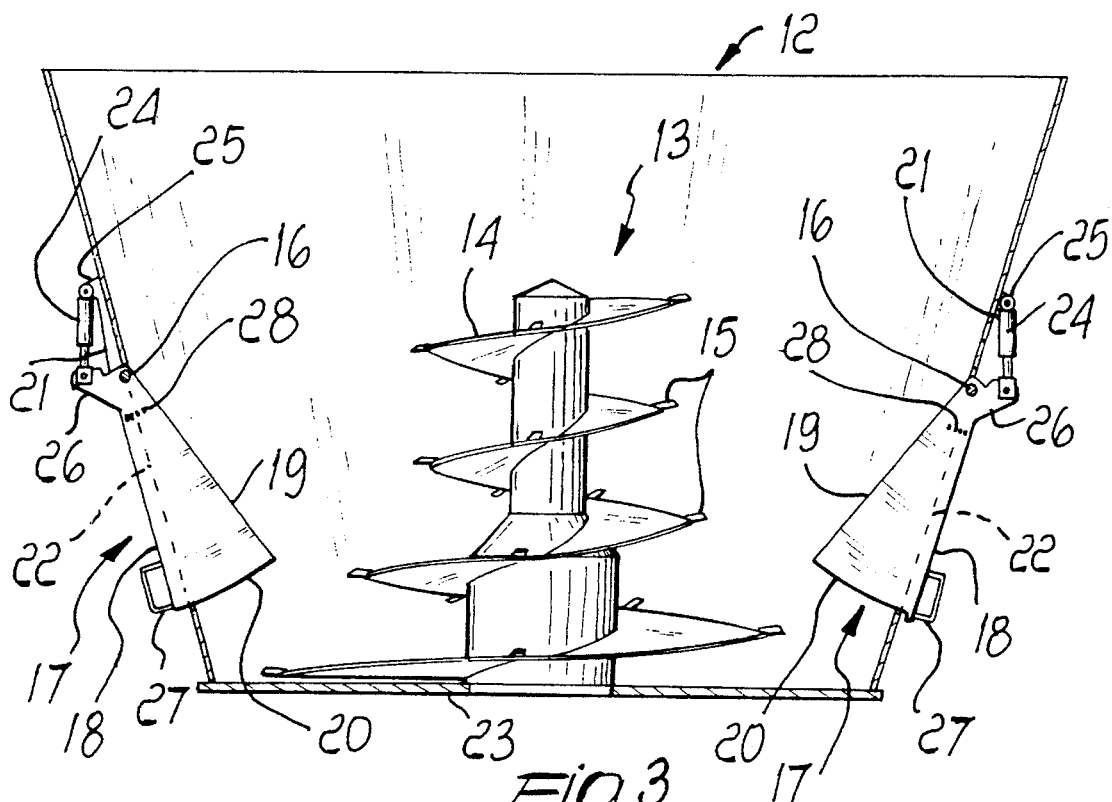
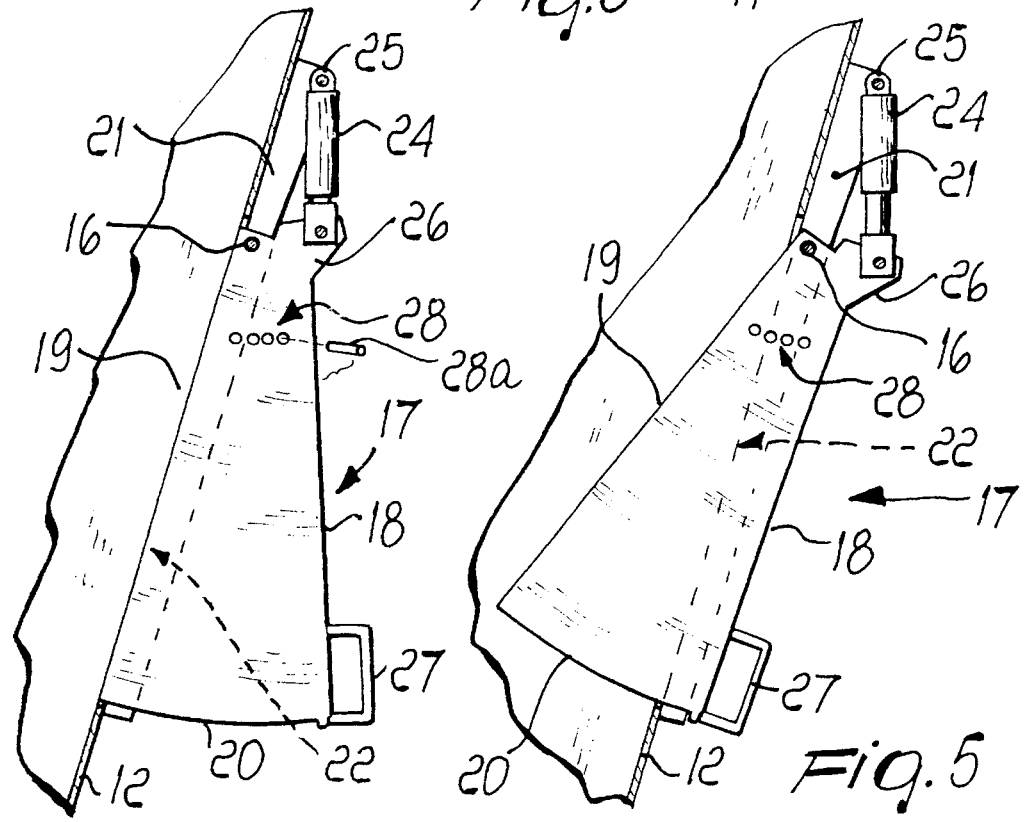

TRUCK FOR SHREDDING AND MIXING PRODUCTS FOR ZOOTECHNICAL USE INCLUDING IMPROVED CUTTERS

BACKGROUND OF THE INVENTION

The present invention relates to an improved truck for shredding and mixing products for zootechnical use.

In the zootechnical field it is known to use combined shredding and mixing trucks with a vertical scroll to prepare animal fodder, particularly for the cattle; these trucks are substantially constituted by a container that is shaped like an inverted frustum and is mounted on a wheeled chassis; a rotating scroll is arranged vertically inside said container, and the profile of its helix lies along an ideal substantially conical surface.

Cutters are fixed to the peripheral region of the scroll and are adapted to shred the product being mixed, which is appropriately loaded from the top and is constituted to a large extent by fibrous material, such as straw and hay added with protein integrators, silage, floury components, etcetera.

With particular reference to FIG. 1 of the accompanying drawings, said figure is a sectional view of the container, designated by the reference letter A, and shows the scroll B and the cutters C that are fixed on its external profile.

In order to contrast the rotary motion of the product being processed that is entrained by the rotating scroll B, countercutters D are arranged vertically in substantially radial positions in the lower part of the container A and can be inserted and extracted through slots provided in the wall of the container A.

Said countercutters D are substantially disk sectors that are pivoted to the container A proximate to their respective vertices.

As shown in FIG. 1, the countercutters D extend upward from the pivoting axis and reach up to a level, considering the bottom of the container A as reference, that affects only the first turn of the helix of the scroll B.

In this manner, when the countercutters are inserted in the container A due to processing requirements, their presence, in addition to the beneficial effect of contrasting the rotation of the material, also has negative effects due to the fact that the scroll, in order to turn said material, must make it rise in level, overcoming the obstacle constituted by said countercutters, and forms a sort of unmixed doughnut in this position.

The vertical motion easily causes the material to overflow from the container A.

Furthermore, the lower parts of the scroll B are stressed more intensely than the upper ones, and the lowermost cutters work more than the upper ones, causing consequent greater wear and non-uniform shredding of the product.

This of course has a negative effect on the wear of the machine parts, on one hand, and on the quality and uniformity of the fodder on the other.

If one tries to solve the problem by reducing the dimensions of the scroll B, the negative effect of moving it away from the countercutters D, reducing their action is obtained.

On the other hand, if the dimensions of the scroll B are increased, the stress to which the motor system is subjected increases, and excessive vertical movements of the material occur, causing it to overflow even more from the container A.

It should also be noted that if large hay bales are inserted, current countercutters D are unable to effectively contrast the rotary motion induced by the scroll B, due to their position, which is adjacent to the bottom of the container A, and therefore the breaking-up and shredding action of said countercutters is very time-consuming in addition to easily causing overflows of material from the upper rim of the container A.

It should also be noted that the above described arrangement of the countercutters D shown in FIG. 1 produces considerable problems in terms of overall machine bulk.

When said countercutters are extracted from the container A, their widest parts in fact protrude considerably in the wall region.

This entails the need to move said countercutter closer to the longitudinal median plane, which is straddled, at the front or at the rear, by the product discharge opening with the corresponding distribution conveyor belt.

SUMMARY OF THE INVENTION

The aim of the present invention is to provide a truck for shredding and mixing products for zootechnical use in which the drawbacks described above in conventional types in relation to countercutters are eliminated.

Within the scope of the above aim, a consequent primary object is to provide a truck in which the mechanical work of its parts, in relation to the stresses to which they are subjected and to their consequent wear, as well as the quality of the shredding and mixing of the animal fodder are optimized.

Another important object is to achieve better and faster shredding.

Another important object is to provide a truck that has less bulk problems in relation to the countercutters.

Another object is to provide a truck in which the countercutters, when actuated manually, do not require levers or other devices adapted to reduce extraction or insertion forces.

This aim, these objects, and others which will become apparent hereinafter are achieved by an improved truck for shredding and mixing products for zootechnical use, of the type that comprises, on a self-propelled or towed wheeled chassis, a container that is substantially shaped like an inverted frustum, is open at the top, and contains a rotating scroll that has a vertical axis and an external profile that lies on an ideal substantially conical surface, shredding cutters being fitted at said profile; vertically arranged countercutters, shaped substantially like a disk sector, being pivoted at their respective vertices to the wall of said container in substantially radial positions; said countercutters being insertable and extractable through appropriate slots; said truck being characterized in that said countercutters are arranged so that the vertex of each one is in a substantially median region of the wall and so that they extend downwards until they affect the lower part of said wall.

BRIEF DESCRIPTION OF THE DRAWINGS

Further characteristics and advantages of the invention will become apparent from the further detailed description of in some embodiments, illustrated only by way of non-limitative example in the accompanying drawings, wherein:

FIG. 3 is a sectional view, taken along a longitudinal vertical plane, of the container of the truck of FIG. 2;

FIGS. 4 and 5 are partially sectional enlarged-scale detail views of a countercutter of the truck of FIGS. 2 and 3 in the positions in which it is respectively fully extracted from the container and fully inserted therein;

DESCRIPTION OF THE PREFERRED EMBODIMENTS

Figure 1:
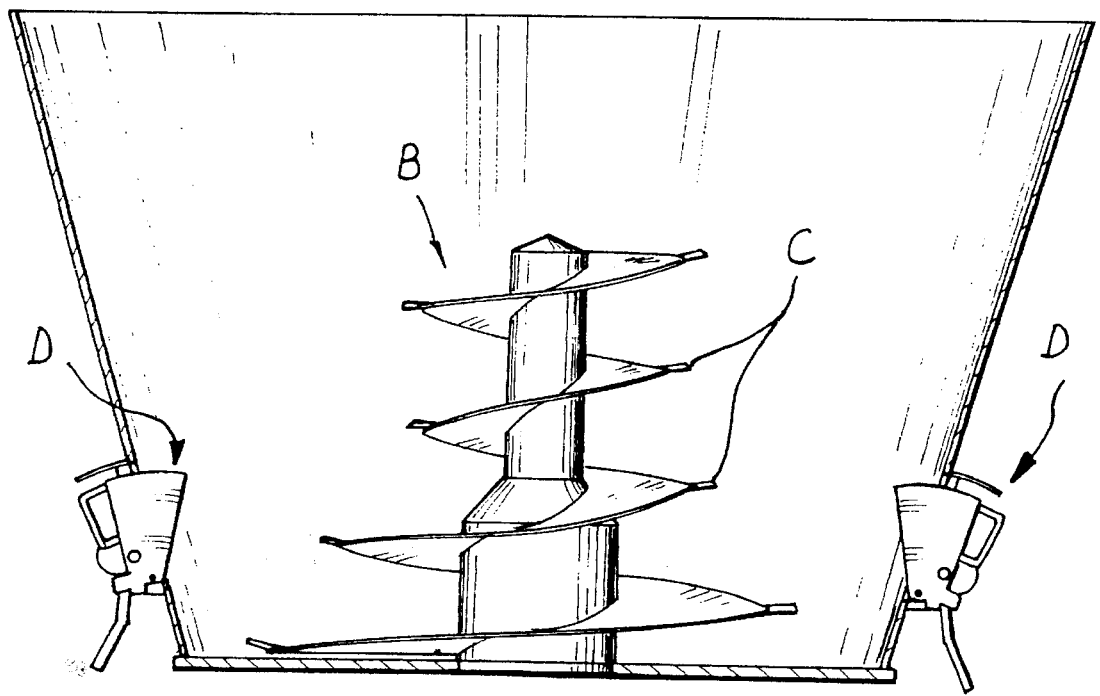
FIG. 1 is, as mentioned, a sectional view, taken along a longitudinal vertical plane, of the container of a truck according to the state of the art.
Figure 2:
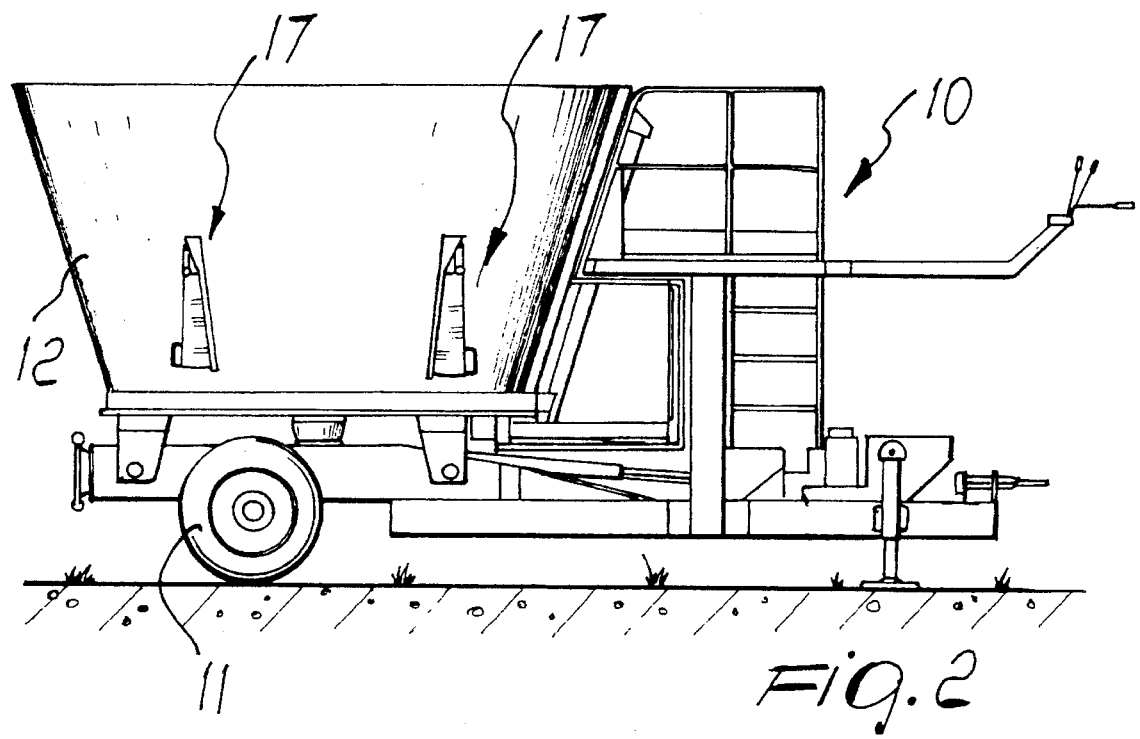
FIG. 2 is a side view of a truck according to the invention.

With reference to the above FIGS. 2 to 5, a truck for shredding and mixing products for zootechnical use comprises, on a chassis 10 with wheels 11, which, in this case is towed, but can also be self-propelled, a container 12 that is substantially shaped like an inverted frustum that is open at the top and contains a rotating scroll 13 that has a vertical axis and an external profile that lies on an ideal substantially conical surface.

Shredding cutters 15 are fitted at the external profile 14 of the scroll 13.

According to the invention, vertically arranged countercutters 17 that are shaped substantially like a disk sector are pivoted to the wall of the container 12, at their respective vertices 16, in substantially radial positions.

Therefore, the profile of each countercutter 17 is composed of two straight sides, respectively 18 and 19, that converge towards the vertex 16, and of a side 20 that is arc-shaped.

The angle covered by the sector is preferably approximately one quarter of a right angle.

Each countercutter 17 is pivoted at a contoured plate 21 that is welded to the outside of the container 12, and insertion in and extraction from said container, occur through an appropriate slot 22.

In this case, each countercutter 17 is arranged so that the vertex 16 is in a substantially median region of the wall of the container 12 and the countercutter 17 extends downwards until it affects the lower part which however is not adjacent to the bottom 23 of the container, which in practice corresponds to a level that is substantially not lower than the first turn of the helix of the scroll 13.

In the case being considered, the actuation of each countercutter 17 is automatic, by means of hydraulic cylinders 24, each of which is anchored, at the ends thereof, between a coupling 25 to the container 12 and an arm 26 that protrudes from the countercutter 17 in a region that is adjacent to the vertex 16.

A handle 27 is furthermore provided at the end of the container which is opposite to the pivoted vertex 16.

A plurality of through holes 28 is also arranged on each countercutter 17 along a line that forms a sector of an arc; by inserting a dowel 28a, said holes can form retainers so as to limit and adjust the insertion of the countercutter 17 in the container 12.

The countercutters 17 might of course also be simply actuated manually, and in this case there are no cylinders 24 but there is a simple handle such as 27 or of another kind.

As regards operation, as already mentioned, during processing, depending on the product fed into the container, the countercutters 17 are inserted so as to contrast the rotation of the product due to the entrainment induced by the scroll 13.

Practical tests have shown that the countercutters 17 improve the action of the uppermost part of the scroll 13, at the same time leaving enough space for the material to fall towards the bottom, in order to make the lower part work.

The action of the scroll has thus been made more uniform, optimizing its stresses in the various parts, and therefore a more uniform result in product processing has been achieved.

Other advantages have also been achieved in relation to the wear of the set of cutters, which is now more uniform.

A better breakup action when large hay bales are loaded has also been achieved, since the considerable length of the countercutters causes them to effectively contrast the rotary motion induced by the scroll in this case also.

Furthermore, as regards the bulk of the truck, when the countercutters 17 are fully extracted, it should be noted that their widest part is located in the region in which the container is narrower.

Finally, it should be noted that in this case the length of the countercutters 17 forms, in case of manual actuation, a good lever arm between the handle and the rotation axis; this, also in view of the fact that the arrangement of the countercutters 17 facilitates their movement, makes it unnecessary to have devices for facilitating insertion in the container 12 and extraction therefrom.

Figure 6:
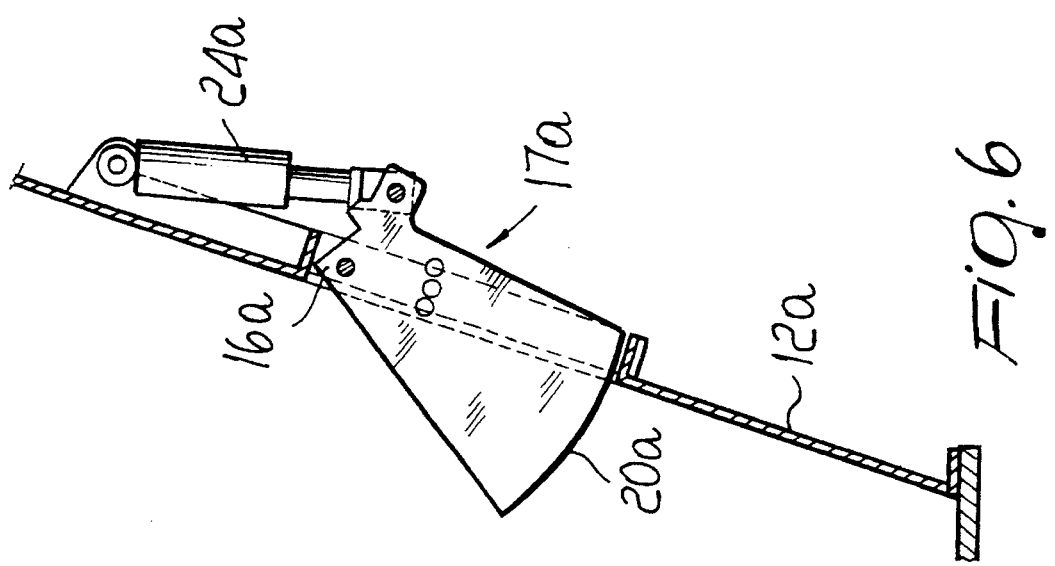
FIG. 6 is a view of a further embodiment of the countercutters.

With reference now to FIG. 6, a further embodiment of the countercutters, generally designated by the reference numeral 17a, again has a triangular configuration of the profile in which one of the sides 20a is curved, but in this case the longitudinal extension is reduced.

The countercutters 17a are also arranged so that the vertex 16a is in an upward region and so that the curved side 20a is at a level of the container 12a that is substantially not lower than the first turn of the helix of the scroll.

In this case, too, there are hydraulic actuation cylinders 24a (which can be replaced with levers for manual actuation).

In practice it has been observed that the intended aim and objects of the truck according to the present invention have been achieved.

Figure 8:
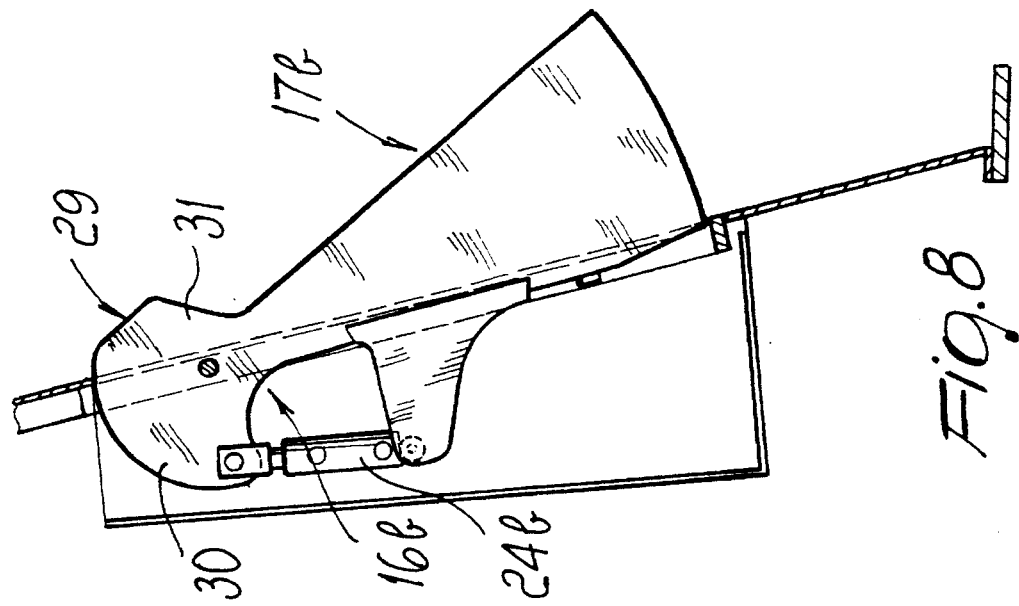
FIGS. 7 and 8 show a still further embodiment of the countercutters in idle and in operative configuration respectively.
Figure 7:
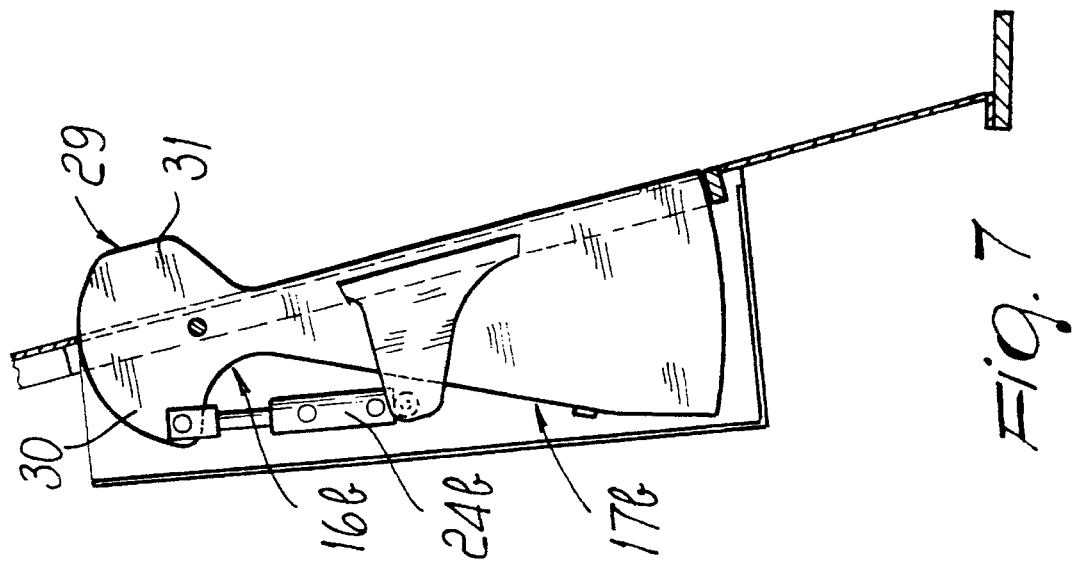

Referring now to FIGS. 7 and 8, in a still further embodiment of the invention, the countercutters 17b have still a triangular configuration, but in this case a shaped lug 29 extends in the vertex zone 16b. The lug has a first external portion 30 for connection of the hydraulic actuation cylinder 24b and an inward second portion 31. The profile of portion 31 is such that with the countercutter 17b extracted (FIG. 7) such portion is completely inside the container 12b, and contrasts the rotary motion induced in the material by the scroll, while with the countercutter 17b inserted in the container 12b (FIG. 8) the portion 31 is at least partially withdrawn towards the exterior for annulling or reducing to the minimum its action.

In practice, the materials employed, so long as they are compatible with the contingent use, as well as the dimensions, may be any according to the requirements.

What is claimed is:

1. A truck for shredding and mixing products for zootechnical use, comprising:

a self-propelled or towed wheeled chassis;

a container being supported on said chassis and being substantially shaped as an inverted frustum defining a peripherical wall and a bottom, said container being open at a top of the container;

a rotating scroll located in said container, said scroll having a vertical axis and an external profile that lies on an ideal substantially conical surface;

shredding cutters being fitted at said profile;

vertically arranged countercutters each of which are shaped substantially as a disk sector, said countercutters each having a respective pivoted vertex which is pivoted to the wall of said container in substantially radial positions; and slots provided in said wall, said countercutters being insertable and extractable through said slots in said container;

said countercutters being arranged so that each said pivoted vertex is in a substantially median region of the wall and so that each one of said countercutters extend downwards from said pivoted vertex at a lower part of said wall.

2. Truck according to claim 1, wherein said countercutters end in a region that is not adjacent to the bottom of said container.

3. Truck according to claim 2, wherein said region that is not adjacent to the bottom is at a level that is substantially not lower than the first turn from the bottom of a helix formed by the profile of said scroll.

4. Truck according to claim 1, wherein an angle covered by each one of said countercutters shaped as a disk sector is substantially one quarter of a right angle.

5. Truck according to claim 1 further comprising hydraulic cylinders which are rigidly coupled between said container and each one of said countercutters for automatic actuation of said countercutters.

6. Truck according to claim 1, wherein each one of said countercutters is provided, in a region that is opposite to the pivoted vertex, with a handle for manual actuation.

7. Truck according to claim 1, wherein each one of said countercutters has, along a line shaped as an angular sector, a plurality of through holes in which a dowel for locking and adjusting insertion of said countercutters in said container is insertable.

8. Truck according to claim 1, wherein each one of said countercutters is arranged so that the respective pivoted vertex is in an upward position, and so that the countercutter extends downward from the pivoted vertex until it reaches a lower part of said scroll at a level that is substantially not lower than a first turn from below of a helix that is formed by the profile of said scroll.

9. Truck according to claim 8, wherein each one of said countercutters has a shaped lug comprising a portion with a profile being such that said portion is internal to the container when said countercutter is extracted from the container, while when the countercutter is inserted in said container said portion is at least partially withdrawn towards the exterior of the container.

\* \* \* \* \*